(12) United States Patent
Onozuka et al.

(10) Patent No.: US 8,967,927 B2
(45) Date of Patent: Mar. 3, 2015

(54) MACHINE TOOL

(75) Inventors: Hideaki Onozuka, Sagamihara (JP); Koji Utsumi, Hitachi (JP); Toshio Yamanaka, Yokohama (JP); Masayuki Kyoi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1266 days.

(21) Appl. No.: 12/830,121

(22) Filed: Jul. 2, 2010

(65) Prior Publication Data

US 2011/0085869 A1    Apr. 14, 2011

(30) Foreign Application Priority Data

Oct. 8, 2009    (JP) .................................. 2009-233977

(51) Int. Cl.
*B23Q 11/00* (2006.01)
*B23B 47/00* (2006.01)
*B23Q 5/40* (2006.01)

(52) U.S. Cl.
CPC .............. *B23Q 11/0035* (2013.01); *B23Q 5/40* (2013.01)
USPC ........... 409/141; 409/235; 409/146; 408/143; 188/378; 188/380

(58) Field of Classification Search
USPC ......... 409/141, 219, 235, 145, 159, 172, 146; 408/143; 188/378, 379, 380
See application file for complete search history.

(56) References Cited

U.S. PATENT DOCUMENTS

| | | | | |
|---|---|---|---|---|
| 3,808,983 A | * | 5/1974 | Pielkenrood | 108/136 |
| 4,033,541 A | * | 7/1977 | Malueg | 248/550 |
| 4,575,942 A | * | 3/1986 | Moriyama | 33/1 M |
| 5,432,422 A | * | 7/1995 | Nagano et al. | 318/611 |
| 5,504,407 A | * | 4/1996 | Wakui et al. | 318/568.17 |
| 5,584,744 A | * | 12/1996 | Shirai et al. | 451/5 |
| 5,988,959 A | * | 11/1999 | Sugata | 409/141 |
| 6,243,619 B1 | * | 6/2001 | Inamasu et al. | 700/180 |
| 6,283,041 B1 | * | 9/2001 | Ono | 108/20 |
| 6,535,787 B1 | * | 3/2003 | Inamasu et al. | 700/180 |
| 6,744,155 B1 | * | 6/2004 | Stoiber | 310/15 |
| 7,125,211 B2 | * | 10/2006 | Zoran | 409/235 |

(Continued)

FOREIGN PATENT DOCUMENTS

| | | | | |
|---|---|---|---|---|
| JP | 60057030 A | * | 4/1985 | F16F 15/02 |
| JP | 2-35652 U | | 3/1990 | |

(Continued)

OTHER PUBLICATIONS

English machine translation of JP 2000107971.*

(Continued)

*Primary Examiner* — Essama Omgba
(74) *Attorney, Agent, or Firm* — Crowell & Moring LLP

(57) ABSTRACT

The table on which a workpiece is put can travel on a guide rail mechanism relative to a working head with a cutting tool mounted thereon. The table is connected through a nut to a ball screw part to move in an axial direction thereof as the ball screw part rotates. One end of the ball screw part is supported by a bearing and the other end is connected to a servomotor to be rotationally driven. A hollow part is provided in the table to receive therein a damper mechanism part, which comprises a spring, a damper, and a weight, the table and the weight being arranged to enable traveling separately on guide rails. Thereby, even when the workpiece is heavy, the weight can move relative to the table to effectively damp vibrations of the table in a feed direction.

15 Claims, 7 Drawing Sheets

(56) References Cited

U.S. PATENT DOCUMENTS

| | | | |
|---|---|---|---|
| 8,231,098 B2 * | 7/2012 | Ryaboy et al. | 248/550 |
| 8,256,590 B2 * | 9/2012 | Suzuki et al. | 188/379 |
| 8,360,697 B2 * | 1/2013 | Hamann et al. | 409/131 |
| 8,398,342 B2 * | 3/2013 | Bolin et al. | 409/141 |
| 8,855,826 B2 * | 10/2014 | Benosman et al. | 700/280 |
| 2002/0170793 A1 * | 11/2002 | Kemeny | 188/378 |
| 2006/0119026 A1 * | 6/2006 | Ryaboy et al. | 267/140.15 |

FOREIGN PATENT DOCUMENTS

| | | | | |
|---|---|---|---|---|
| JP | 2-243265 A | | 9/1990 | |
| JP | 4-310064 A | | 11/1992 | |
| JP | 04321836 A | * | 11/1992 | F16F 15/02 |
| JP | 8-200437 A | | 8/1996 | |
| JP | 10-202461 A | | 8/1998 | |
| JP | 2000107971 A | * | 4/2000 | B23Q 5/44 |
| JP | 2000107976 A | * | 4/2000 | B23Q 11/00 |
| JP | 2004-176825 A | | 6/2004 | |
| JP | 2005-1041 A | | 1/2005 | |
| JP | 2007-203435 A | | 8/2007 | |
| JP | 2009270647 A | * | 11/2009 | F16F 15/02 |

OTHER PUBLICATIONS

Machine English translation of JP 2009270647.*
Altintas: Manufacturing Automation, Cambridge University Press, pp. 104-115, 2000.
Japanese Office Action with partial English Translation dated May 28, 2013 (Two (2) pages).

* cited by examiner

MACHINE TOOL

INCORPORATION BY REFERENCE

The present application claims priority from Japanese application JP2009-233977 filed on Oct. 8, 2009, the content of which is hereby incorporated by reference into this application.

BACKGROUND OF THE INVENTION

The present invention relates to an apparatus for working a workpiece by relatively moving a rotating cutting tool and a table with the workpiece put thereon, and more particular, to an apparatus for working a workpiece wherein vibrations of the table are suppressed, which vibrations bring about a disadvantage such as degradation in machining accuracy and breakage of the cutting tool, in case of working a large-sized or lengthy workpiece.

In cutting work of a workpiece by the use of a rotating cutting tool, a part or parts, which constitute a machine tool, suffers self-excited vibrations in the case where the machine tool and the workpiece are small in dynamic stiffness (stiffness in motion), or in the case where a cutting force acting between the cutting tool and the workpiece is large. Self-excited vibrations as generated are transmitted to the cutting tool with the result that a worked surface of the workpiece becomes wavy and increases in surface roughness, thus making it impossible to obtain a desired machining accuracy. Further, when the self-excited vibrations increase, there is brought about a disadvantage that a cutting blade of the cutting tool itself is nicked, or increased in abrasion, and the cutting tool itself is eventually shortened in service life.

In the case where a workpiece is a large-sized or lengthy member, a structure of a machine tool used, for example, in cutting work of a railway rail over 20 meters, working of a high-accuracy guide rail (5 to 8 meters) of a conveyance stage used in manufacture of liquid crystal panels, or the like becomes necessarily large, so that it is desired to improve a constituent member or members in dynamic stiffness not to bring about self-excited vibrations at the time of working.

Generally, a large-sized, cutting machine tool described above frequently employs a ball screw system, which is combined with a rotating machine for traveling of a table with a workpiece put thereon. Of course, since the ball screw itself is increased in length, the ball screw itself is liable to suffer self-excited vibrations when the workpiece is worked, and the vibrations are transmitted to the table to make high-accuracy working of the workpiece difficult.

As one of countermeasures in such case, a part or parts, which constitute a machine tool, are increased in thickness to improve the machine tool in dynamic stiffness. Since such countermeasure makes the machine tool large-sized and heavy, however, not only a large amount of energy is required, for example, to move a heavy table but also much cost is needed in running of the apparatus.

As another countermeasure, a method described in JP-A-2007-203435 has been proposed. That is, in the case where a working head with a cutting tool mounted thereon is driven by a ball screw, an opposite side part of the ball screw with respect to the working head is formed with inverse threads and a weight is moved in an opposite direction with respect to the working head to cancel reaction generated when the working head is driven, thus suppressing vibrations acting on the ball screw.

Also, JP-A-10-202461 proposes a method of suppressing vibrations acting on a table by virtue of movements of a damper, which comprises a weight and a spring and is mounted on the table with a workpiece put thereon.

JP-A-02-243265 discloses a construction, in which a table travels on rails, that is, a stationary member (base) with the use of a ball screw and a damper provided in the table is used to absorb vibrations at that time.

According to the disclosure of the JP-A-2007-203435, variation in moving speed of the working head driven by the ball screw is cancelled but there is not provided a mechanism for suppressing vibrations suffered by a workpiece in working. Also, according to the disclosure of the JP-A-10-202461, a vibration absorbing body, that is, the damper, which comprises a weight and an elastic body (spring), mounted on the table is used to suppress vibrations accompanying movements of a ball screw. At this time, the heavier the weight, which constitutes the damper, the more effective the vibration damping effect, but it cannot but be said that since a member, which supports the table itself, is the ball screw itself for realization of feed of the table, it is difficult to suppress vibrations at the time of working large-sized or lengthy and heavy goods being an object of working in the invention.

On the other hand, JP-A-02-243265 discloses a structure for solving matters of bottlenecks in the JP-A-10-202461. That is, the table travels on the rail grooves provided on the stationary member so as to cope with working of heavy goods. At this time, the damper (comprising a weight and a spring) mounted in the table serves to suppress vibrations transmitted to the table. Since the weight is needed to move without suffering an unnecessary resistance in a vibratory direction, however, it must be arranged in no contact with a table inner wall and so there is involved a disadvantage that it is very difficult to make the weight heavy to improve a vibration damping effect.

As described above, in case of cutting work while using a ball screw system to move a table on which a large-sized workpiece or lengthy and heavy goods are put, there is involved a serious problem that the ball screw itself becomes necessarily lengthy and spatial displacement of the ball screw itself in operation is transmitted as vibrations to the table to bring about degradation in machining accuracy, or the like.

SUMMARY OF THE INVENTION

In order to solve the above-mentioned problem, a structure is provided in which a table travels on guide rails provided independently so that the weight of the table, on which a workpiece is put, has no influence on motions of a ball screw part for conveyance of the table, and in which a damper mechanism part travels on the guide rails, is connected to the table in order to effectively damp vibrations acting on the table. More specifically, a machine tool constructed in a manner described hereinafter is provided.

The machine tool makes use of a rotating cutting tool to work a workpiece put on a cutting work table traveling on guide rails with the use of torque of a ball screw part and comprises a damper mechanism part mounted in a cavity provided on an opposite side of the table to that surface thereof on which a workpiece is put, and comprising a weight, a spring and a damper, one ends of the weight and the damper being connected to an inner wall of the table with a vibratory direction of the spring agreeing with a moving direction of the table, the other ends of the weight and the damper being connected to the weight and the damper, and the weight being arranged in a manner to travel on the guide rails.

In order to efficiently damp vibrations, which a workpiece being heavy goods suffers at the time of working, it is necessary to make the weight heavy and the guide rails are arranged to surely bear and freely move the weight but the guide rails may serve as traveling guide rails for the cutting work table, or may be provided separately.

Also, the damper mechanism part may be received in the table, or may be connected thereto to agree with a moving direction of the table. Specifically, the weight is connected through the spring and the damper to that surface of the table, which is perpendicular to a traveling direction of the table, the weight being arranged in a manner to travel on the guide rails.

As described above, by using a construction, in which the weight constituting the damper mechanism part is made to independently travel on the guide rails, the weight being heavy can be freely moved without having any influence on driving of the ball screw part. Thereby, it is possible to extremely effectively damp vibrations transmitted to the table and to accurately work a workpiece being heavy goods.

Other objects, features and advantages of the invention will become apparent from the following description of the embodiments of the invention taken in conjunction with the accompanying drawings.

DETAILED DESCRIPTION OF THE PREFERRED EMBODIMENT

Embodiments of the invention will be described hereinafter with reference to the drawings.

First Embodiment

Figure 1:
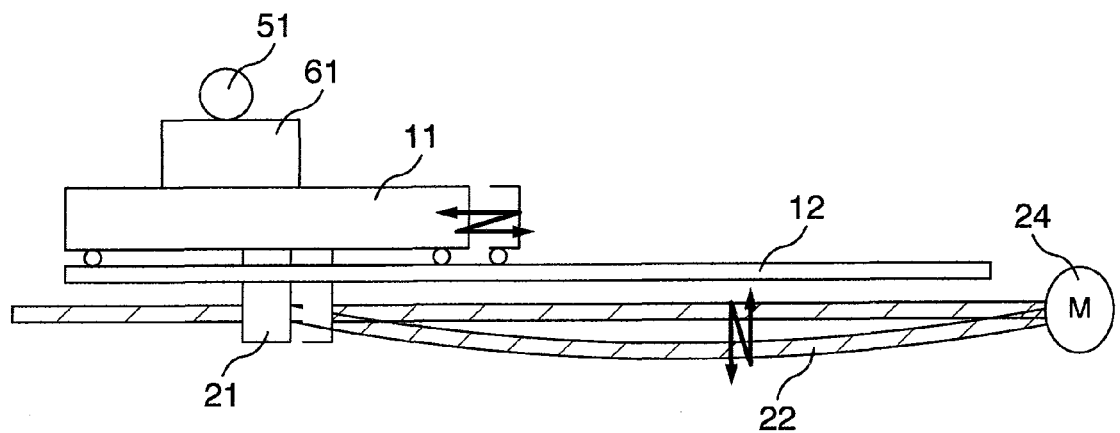
FIG. 1 is a schematic view illustrating vibrations generated when a lengthy ball screw system is used.

Generally, when a table for cutting work is moved and a workpiece put on the table is worked over a whole length thereof, a distance, over which the table is moved, becomes necessarily large and a ball screw part for feeding the table must be made lengthy. For example, FIG. 1 is a schematic view illustrating vibrations generated on a machine tool when a lengthy ball screw system is used. A workpiece 61 is put on a table 11 for cutting work and the table 11 travels on guide rails 12 moving relative to a cutting tool 51, which is provided separately, to achieve a cutting work. A nut 21 is mounted on an underside of the table 11 and a ball screw 22 fitted into the nut 21 rotates whereby the table 11 is moved by a distance corresponding to a rotating angle and a lead of the ball screw. In addition, the ball screw 22 is connected to a servomotor 24 and caused to rotate in a forward direction or a backward direction whereby the table 11 advances or retreats.

As apparent from the above-mentioned example, the longer in length the ball screw 22, the lower in stiffness the ball screw 22, so that the ball screw 22 is liable to flex in a vertical direction as shown in the FIG. 1. Due to this, when the cutting tool 51 is used to work the workpiece 61, exertion of a force on the table 11 causes the ball screw 22 to flex thus generating vibrations in a feed (advancing and retreating) direction of the table 11.

Figure 2:
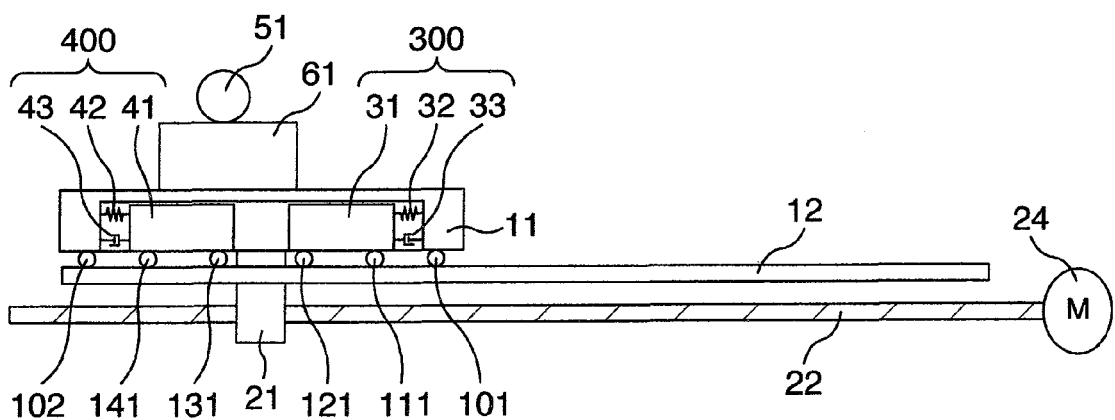
FIG. 2 is a schematic view illustrating a first embodiment of the invention.

FIG. 2 shows a first embodiment of the invention as a method of suppressing vibrations of the table 11.

The same elements as those in FIG. 1 are denoted by the same reference numerals as those in the latter and an explanation therefor is omitted. A difference from the machine tool shown in FIG. 1 resides in damper mechanism parts 300, 400 mounted on the table 11. The damper mechanism part 300, 400, comprises a weight 31, 41, a spring 32, 42, and a damper 33, 43. The table 11 is internally hollow and the weight 31, 41 is connected to an inner wall, which extends in a traveling direction of the table 11, through the spring 32, 42 and the damper 33, 43.

Wheels 101, 102, which travel on the guide rails 12, are mounted on an underside of the table 11 and likewise wheels 111, 121 and 131, 141 are mounted on the weights 31, 41. The guide rails 12 may serve for the table 11 and the weights 31, 41, or the guide rails 12 may be separately provided for the table 11 and for the weights 31, 41. Also, parts for traveling on the guide rails are not limited to wheels provided that they serve for the purpose of the invention.

Owing to the structure, in which the table 11, on which the workpiece 61 is put, and the weights 31, 41 are supported by the guide rails 12, the weights 31, 41 being large in weight corresponding to the workpiece 61, which is large or lengthy and large in weight, can be used whereby it is possible to extremely effectively damp vibrations generated on the table 11.

Figure 3:
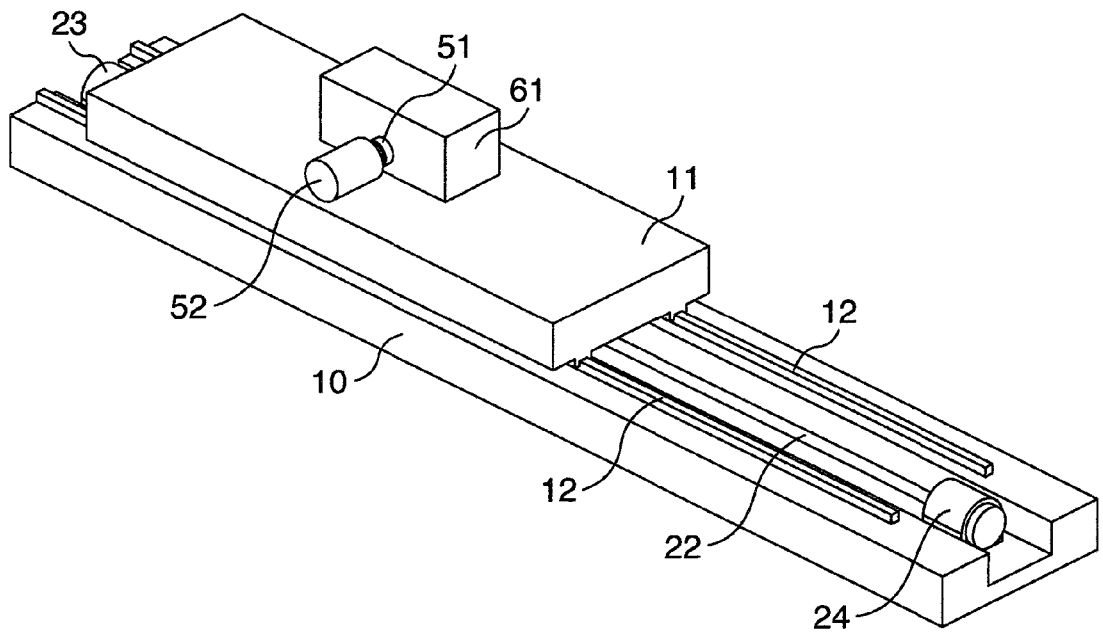
FIG. 3 is a perspective view illustrating a machine tool, according to the first embodiment of the invention, as viewed slantwise from above.

FIG. 3 is a perspective view showing the machine tool, according to the first embodiment, as viewed slantwise from above. In FIG. 3, a tool spindle 52 for driving the rotating cutting tool 51 is used to work the workpiece 61 put on the table 11. Also, the table 11 travels on the guide rails 12 mounted on upper parts (edge parts) of a concavely-shaped base 10 and the ball screw part 22 is connected at one end thereof to the servomotor 24 and is rotatably supported at the other end thereof by a bearing part 23, and is housed in a grooved part of the base 10.

While an interior of the table 11 is hidden and unseen, it is hollow as illustrated in FIG. 2 to internally receive therein the damper mechanism parts 300, 400. In addition, the weights 31, 41 are mounted in the interior so as not to come into contact with the inner walls of the table 11.

Figure 4:
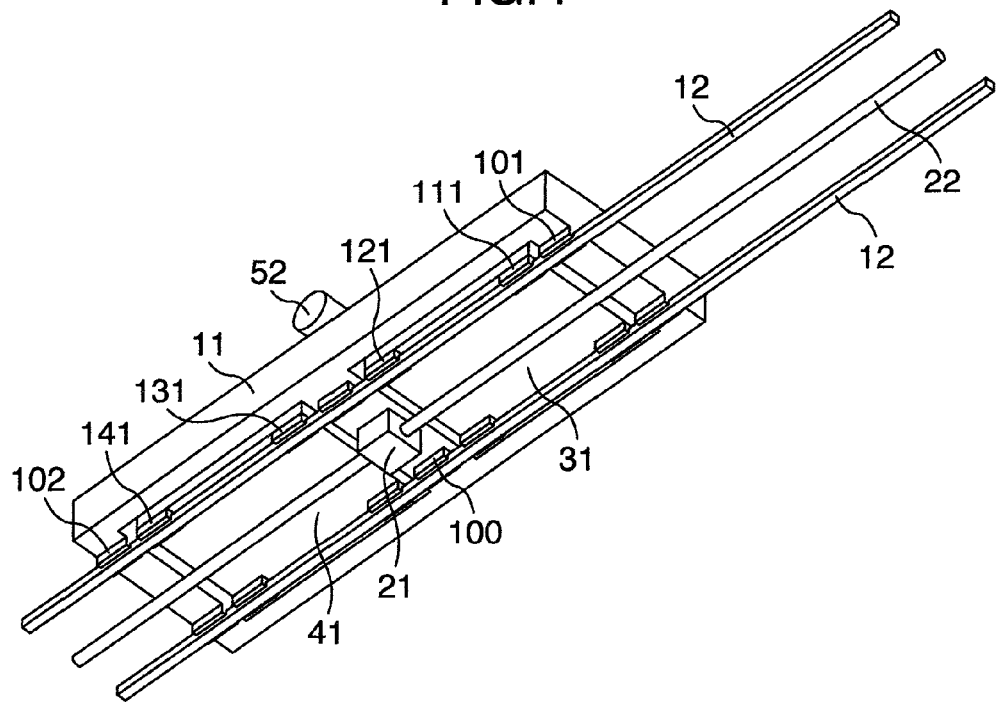
FIG. 4 is a perspective view illustrating the machine tool, according to the first embodiment of the invention, as viewed slantwise from under (bask side)

FIG. 4 is a perspective view showing the machine tool, according to the first embodiment, as viewed slantwise from under. The ball screw part 22 is arranged in a manner to be interposed by the two guide rails 12, and torque of the ball screw part 22 moves the table 11 through the nut 21 mounted to the underside of the table 11. As illustrated in FIG. 2, the wheels 100, 101, 102 mounted to the underside of the table 11, the wheels 111, 121 and 131, 141 mounted to the weights 31, 41 are arranged in a manner to individually travel on the guide rails 12. A positional relationship of the guide rails 12 and the ball screw part 22 is taken into consideration such that loading by the workpiece 61 put on the table 11 or the weights 31, 41 has no influence on movements of the ball screw part 22 through the nut 21 mounted to the underside of the table 11.

The weights 31, 41 are arranged in a manner not to come into contact with the table 11, and they are displaced relative to the table 11 owing to expansion and contraction of the springs (32, 42) and the dampers (33, 43) when the table 11 suffers vibrations. Relative vibrations of the table 11 and the weights 31, 41 are damped by the dampers 33, 43 and by friction between the guide rails 12 and the wheels. If contact between the inner walls of the table and the weights occurs, generation of abrasion and abraded powder due to sliding causes foreign matters to get onto the guide rail surfaces, thus bringing about shortening of the service life of the guide rails. Also, since friction coefficients between solids vary according to an ambient atmosphere such as temperature, humidity, or the like, it is not possible to obtain a stable damping coefficient and it becomes difficult to stably suppress vibrations of the table. Therefore, it is necessary to pay a careful attention to the positional relationships among the table and the springs, dampers, weights, etc.

Subsequently, an explanation will be given to characteristics of vibrations generated on the table 11 in the case where two damper mechanism parts (300, 400) are used.

Figure 5:
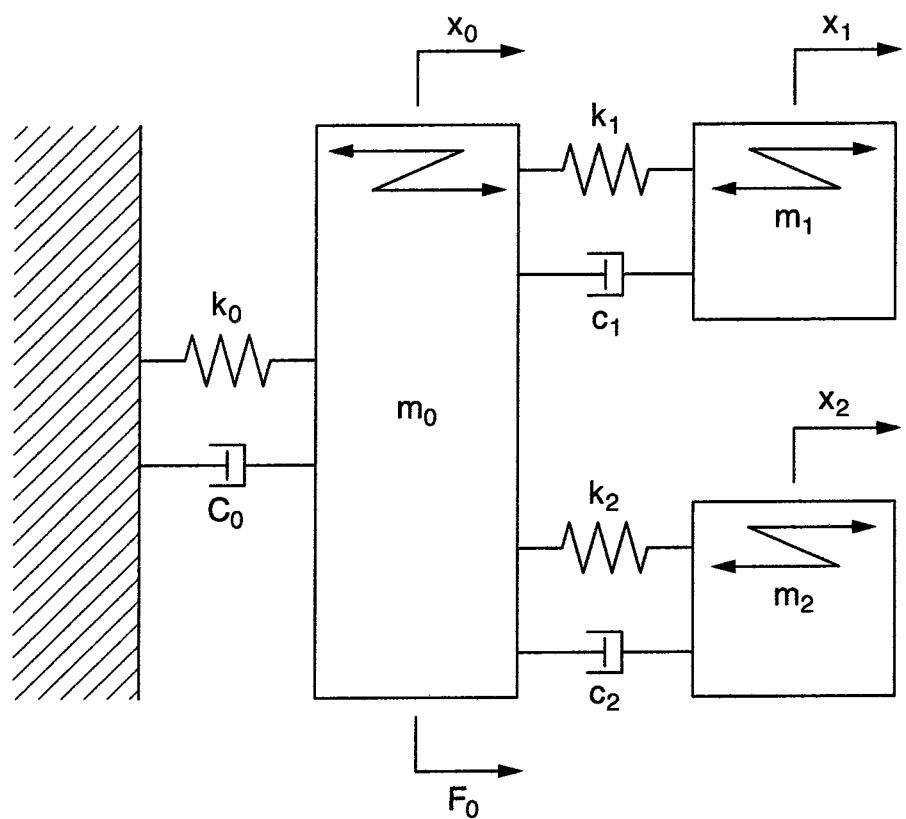
FIG. 5 is an equivalent network diagram illustrating a vibration system model in a damper mechanism part used in the first embodiment of the invention.

FIG. 5 is an equivalent network diagram for analysis of characteristics of vibrations. The table 11 constitutes a mass point having a mass m0 and is supported by a spring having a spring constant k0 and a damper having a damping coefficient c0. The weight 31 constitutes a mass point having a mass m1 and is connected to the table 11 by a spring having a spring constant k1 and a damper having a damping coefficient c1. The weight 41 constitutes a mass point having a mass m2 and is connected to the table 11 by a spring having a spring constant k2 and a damper having a damping coefficient c2.

Excluding displacements of the table 11 given by traveling and assuming that x0 indicates displacements of the table 11 caused by vibrations, x1 indicates displacements of the weight 31 caused by vibrations, and x2 indicates displacements of the weight 41 caused by vibrations, an equation of motion when an external force F0 acts on the table 11 is represented by the following formula (1).

$$k_0 x_0 + c_0 \dot{x}_0 + m_0 \ddot{x}_0 = F_0 + F_{10} + F_{20} \tag{1}$$

Here, F10 indicates a force exerted on the table 11 by the weight 31 and F20 indicates a force exerted on the table 11 by the weight 41.

Subsequently, for the weight 31 and the weight 41, the following formula (4) is obtained by substituting the following formulae (2) and (3) into the formula (1).

$$k_1(x_1 - x_0) + c_1(\dot{x}_1 - \dot{x}_0) + m_1 \ddot{x}_1 = F_{10} \tag{2}$$

$$k_2(x_2 - x_0) + c_2(\dot{x}_2 - \dot{x}_0) + m_2 \ddot{x}_2 = F_{20} \tag{3}$$

$$\begin{bmatrix} m_0 & 0 & 0 \\ 0 & m_1 & 0 \\ 0 & 0 & m_2 \end{bmatrix} \begin{bmatrix} \ddot{x}_0 \\ \ddot{x}_1 \\ \ddot{x}_2 \end{bmatrix} + \begin{bmatrix} c_0 + c_1 + c_2 & -c_1 & -c_2 \\ -c_1 & c_1 & 0 \\ -c_2 & 0 & c_2 \end{bmatrix} \tag{4}$$

$$\begin{bmatrix} \dot{x}_0 \\ \dot{x}_1 \\ \dot{x}_2 \end{bmatrix} + \begin{bmatrix} k_0 + k_1 + k_2 & -k_1 & -k_2 \\ -k_1 & k_1 & 0 \\ -k_2 & 0 & k_2 \end{bmatrix} \begin{bmatrix} x_0 \\ x_1 \\ x_2 \end{bmatrix} = \begin{bmatrix} F_0 \\ 0 \\ 0 \end{bmatrix}$$

Figure 6:
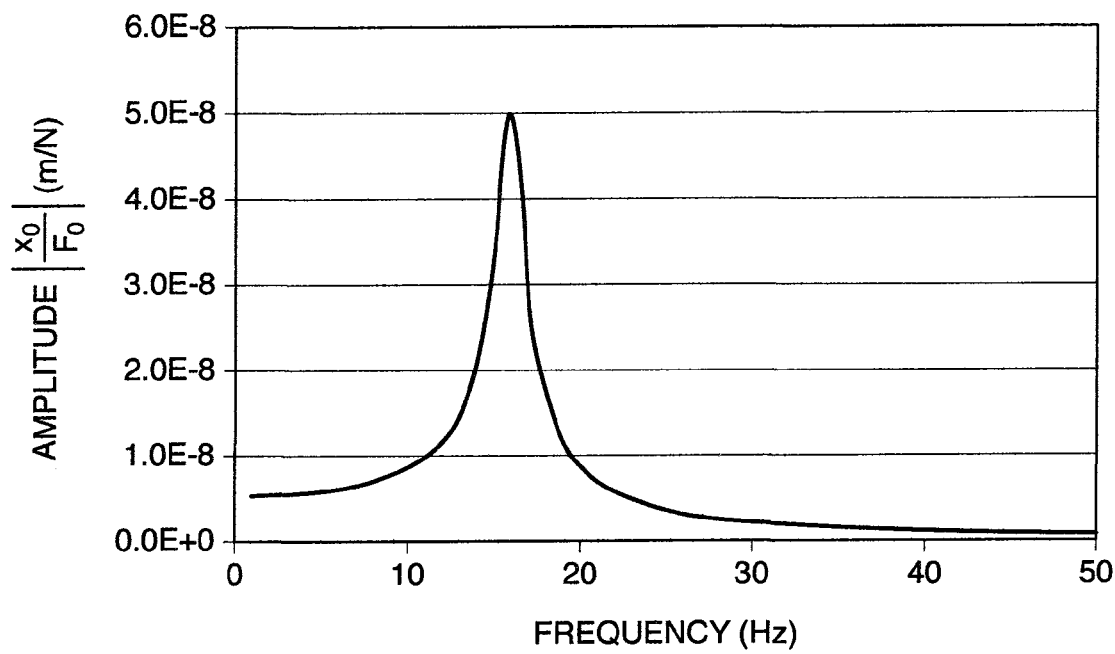
FIG. 6 is a view illustrating a frequency characteristic of vibrations in a feed direction of a table to show a comparative example in the case where a damper mechanism part is not provided.
Figure 7:
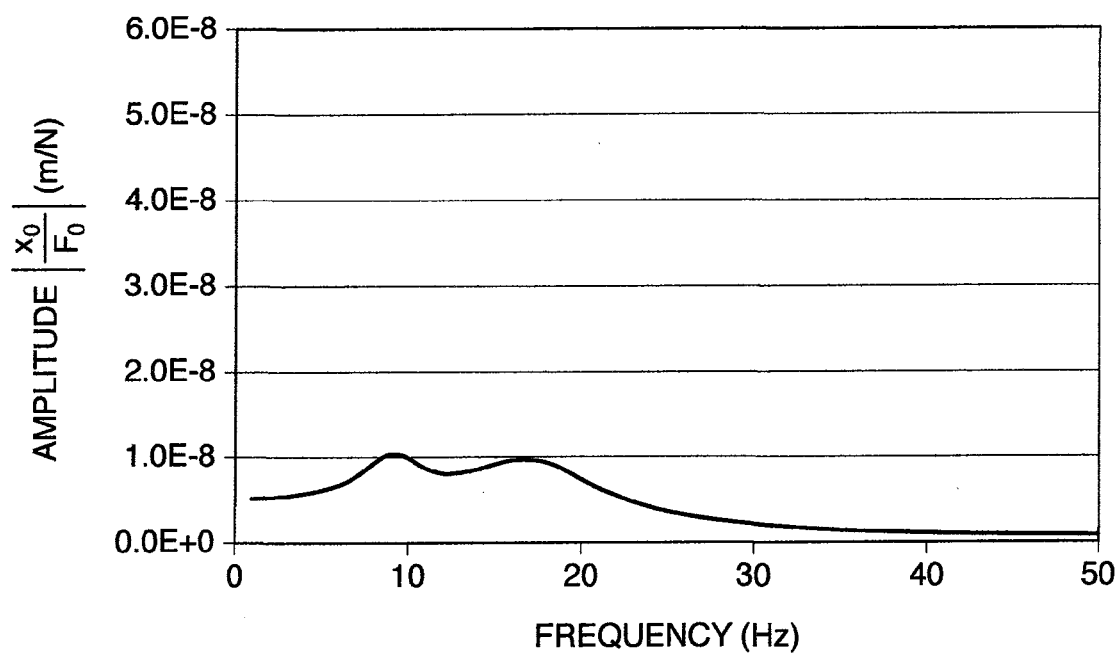
FIG. 7 is a view illustrating a frequency characteristic of vibrations in a feed direction of a table to show an example in the case where a damper mechanism part is provided.

Subsequently, FIGS. 6 and 7 show results obtained by solving the formula (4) to find the frequency response characteristic x0/F0 of vibration displacements x0 relative to the external force F0 exerted on the table 11. In addition, FIG. 6 show results in the case where the damper mechanism parts 300, 400 in FIG. 2 are not provided and FIG. 7 show results in the case where the damper mechanism parts are provided.

Here, the following data were used. That is, the table 11 was a rectangular parallelepiped having a width of 2 m, a length of 6 m, and a height of 1 m and being internally hollow. Also, the mass m0 of the table 11 was 20000 (kg), the spring constant k0 of the spring supporting the table 11 was $2.0 \times 10^8$ (N/m), and the damping coefficient c0 of the damper supporting the table 11 was 200000 (Ns/m). Also, the mass m1 of the weight 31 and the mass m2 of the weight 41, respectively, were 5000 (kg). Also, the spring constant k1 of the spring 32 and the spring constant k2 of the spring 42, respectively, were $2.2 \times 10^7$ (N/m) and the damping coefficient c1 of the damper 33 and the damping coefficient c2 of the damper 43, respectively, were 199000 (Ns/m).

As apparent from FIG. 6, in the case where the damper mechanism parts were not provided in the table 11, a large amplitude was observed at the natural frequency of about 16 (Hz). In other words, it is indicated that in the course of cutting a workpiece, the table itself experienced vibrations having the above natural frequency thereby involving the danger of remarkable inhibition in machining accuracy, etc. On the other hand, the results in FIG. 7 show that the damper mechanism parts were received in the table 11 to thereby enable effectively damping vibrations of the table in any frequency zone. Comparing with the results in FIG. 6, vibrations of the table are restricted to about ⅕.

As described above, in case of cutting a large-sized or lengthy workpiece, a shaft of a ball screw part for feeding a table cannot but necessarily be made lengthy. In some cases, self-excited vibrations are generated in cutting work as the shaft is made lengthy. Liability of generation of such self-excited vibrations is determined by the dynamic stiffness of that structure, which constitutes a machine tool, that is, a frequency response of vibrations thus obtained, the number of blades of a cutting tool, conditions of cutting work, and so on. Hereupon, with the use of the method disclosed by Altintas: Manufacturing Automation, Cambridge University Press, p. 104 (2000), an examination has been made for stability evaluation of self-excited vibrations when a workpiece is worked by a cutting tool, in relation to the presence of the damper mechanism parts proposed in the present invention.

Figure 8:
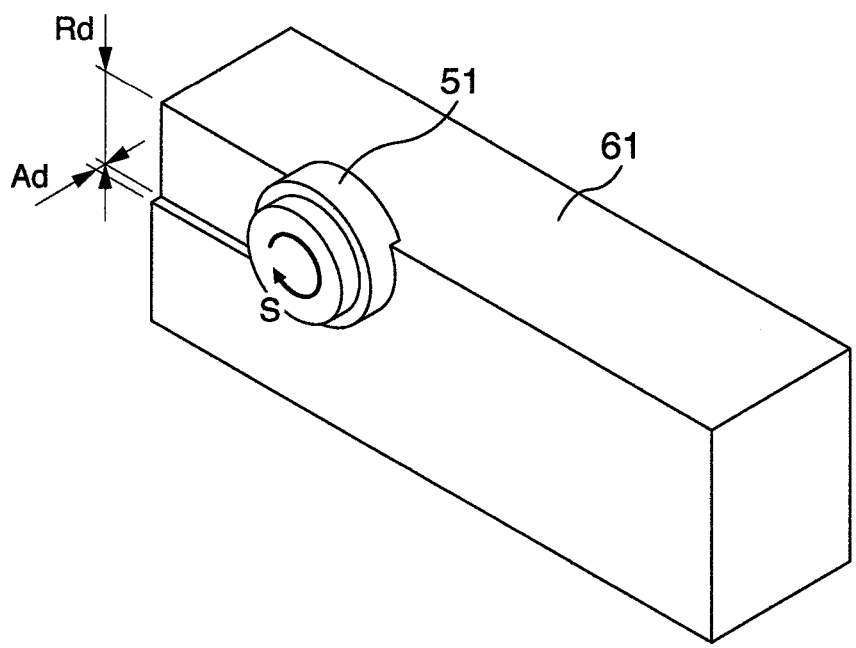
FIG. 8 is a schematic view illustrating a cutting depth by a tool in a radial direction and a cutting depth by a tool in an axial direction in the first embodiment of the invention.

FIG. 8 is a schematic view illustrating the working condition when the workpiece 61 was worked by the use of the cutting tool 51. FIG. 8 shows the case where the cutting tool 51 was rotated clockwise to cut the workpiece 61 starting from a left end in the drawing. At that time, the working conditions were a cutting depth Rd (mm) in a radial direction, a cutting depth Ad (mm) in an axial direction, and a number S (rpm) of revolutions of the cutting tool, and specifically, sixteen rotating tools having a diameter of 250 mm were used with the cutting depth Rd in a radial direction being 200 mm. Also, a constant used in calculation of a cutting force was given assuming that for an amount removed by cutting per unit area, a force of 3000 (N/mm$^2$) in a direction tangent to rotation of the tool and a force of 2000 (N/mm$^2$) in a radial direction of rotation of the tool acted.

Figure 9:
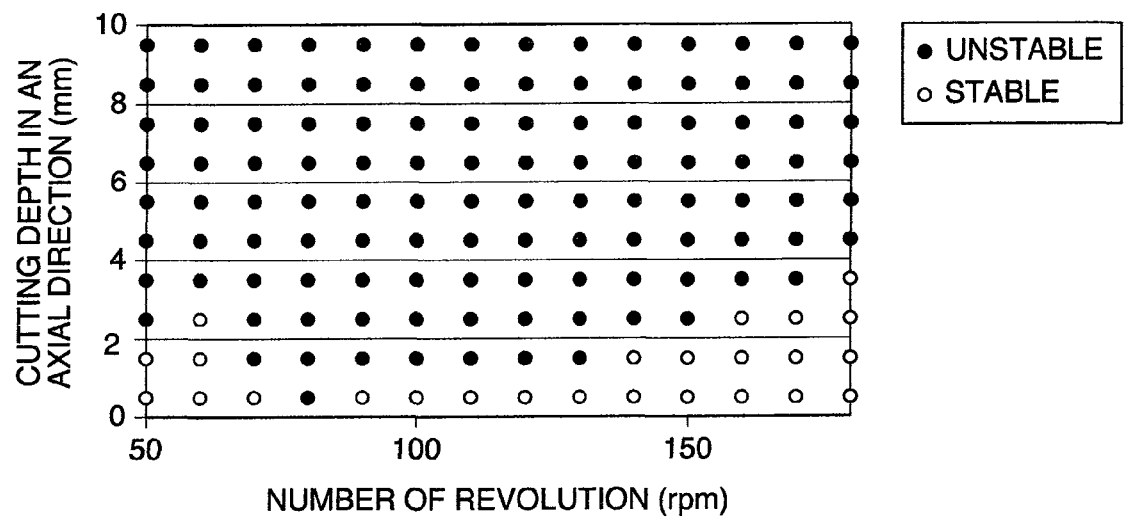
FIG. 9 is a schematic view illustrating an example of cutting work in the first embodiment of the invention and representing the relationship between conditions of cutting work and presence of vibrations generated on a table in the case where a damper mechanism part is not provided.
Figure 10:
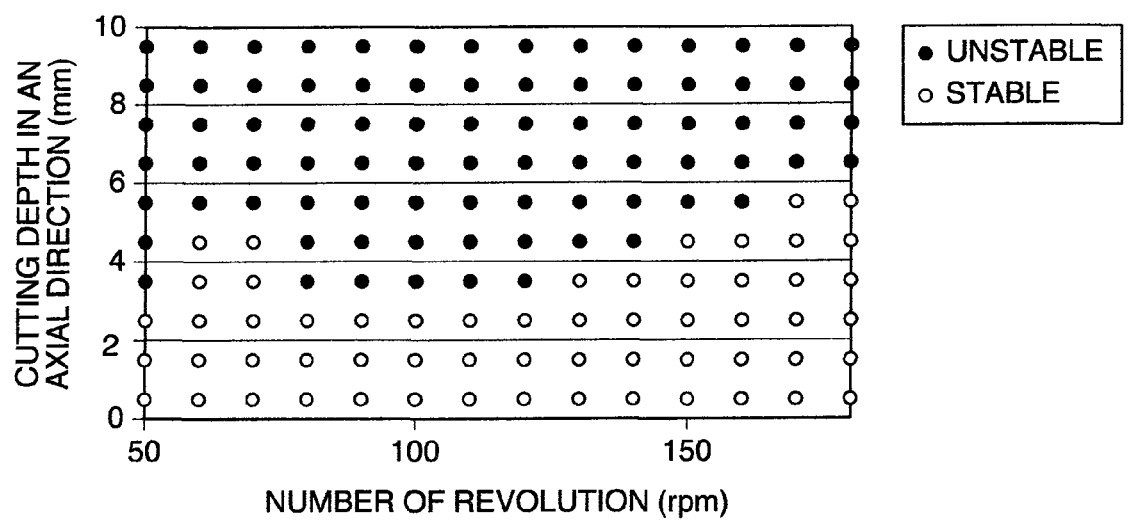
FIG. 10 is a schematic view illustrating an example of cutting work in the first embodiment of the invention and representing the relationship between conditions of cutting work and presence of vibrations generated on a table in the case where a damper mechanism part is provided.

FIGS. 9 and 10, respectively, show results of stability in self-excited vibrations of a machine tool in the respective cases where the damper mechanism parts were provided and not provided. In both drawings, symbols of white circles indicate a stable cutting work not accompanied by self-excited vibrations and symbols of black circles indicate an unstable cutting work in the relationship of cutting depth Ad (mm) in an axial direction with the number S of revolutions of the cutting tool.

As a result, it is seen from FIG. 9 that when the damper mechanism parts were not used, self-excited vibrations were readily generated and a stable cutting work could not be performed under the working conditions of the number S of 100 (rpm) of revolutions of the cutting tool and the cutting depth Ad of at least 1.0 (mm) in an axial direction. On the other hand, as apparent from the results of analysis in FIG. 10, a zone (working conditions) of cutting work in a stable state is increased by adopting the damper mechanism parts. Specifically, it is shown that in case of the number S of 100 (rpm) of revolutions of the tool, the cutting depth Ad in an axial direction was increased to 2.5 (mm) from 1.0 (mm) to enable cutting work in a correspondingly short period of time.

The results shown in FIGS. 9 and 10 show that working of even a large-sized or lengthy and heavy workpiece can be achieved generally in an increased working efficiency and besides stably by mounting the damper mechanism part shown in FIG. 2 on a table for cutting work and realizing a state of enabling weights, which constitute the damper mechanism part, and the table, respectively, to freely travel on guide rails.

Second Embodiment

Figure 11:
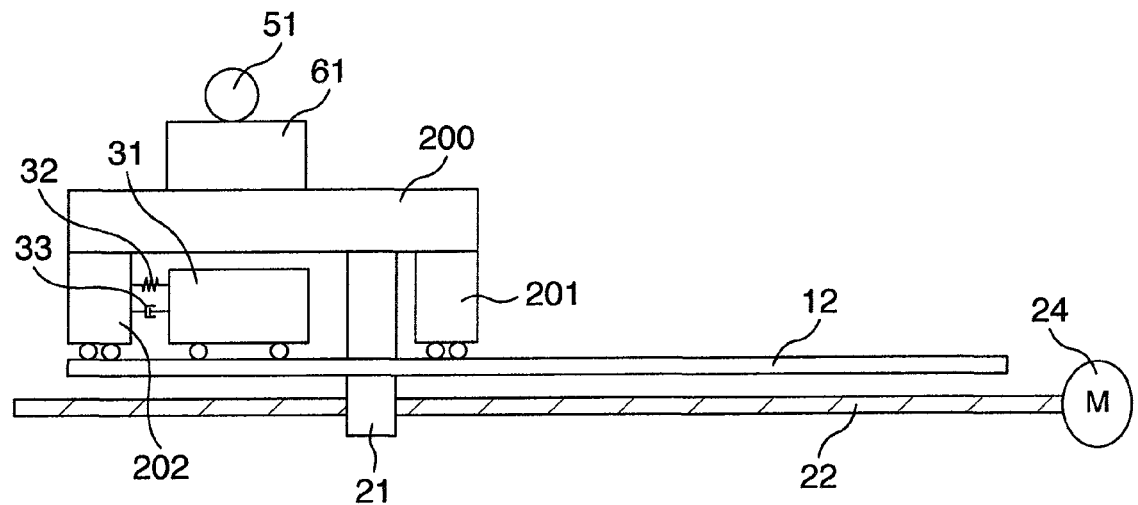
FIG. 11 is a schematic view illustrating a second embodiment of the invention.

FIG. 11 is a schematic view showing a cutting machine tool, according to a second embodiment, in which a ball screw system is used. A difference of the second embodiment from the first embodiment (see FIG. 2) resides in that a table 200 for cutting work with a workpiece 61 put thereon is a flat plate and the flat-plate table 200 and struts 201, 202 are used to form a cavity instead of the cavity formed in the interior of the table 11 as shown in FIG. 2.

A highly efficient and stable cutting work is possible in the same manner as in the first embodiment. Further, the arrangement enables freely designing the cavity part in the table and is suited to the case where a further large-sized weight must be used.

Third Embodiment

Figure 12:
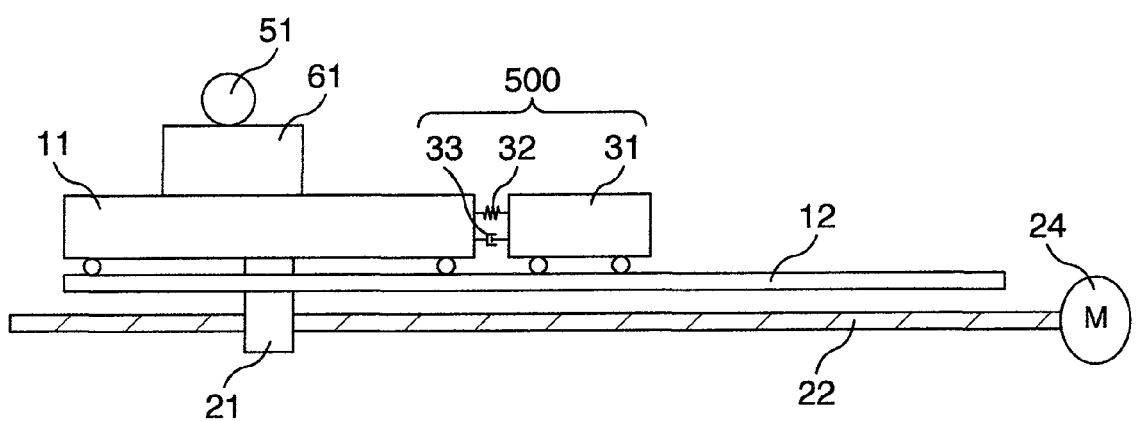
FIG. 12 is a schematic view illustrating a third embodiment of the invention.

FIG. 12 is a schematic view showing a cutting machine tool, according to a third embodiment, in which a ball screw system is used. A difference of the third embodiment from the first embodiment (see FIG. 2) resides in a manner of connecting a damper mechanism part 500 to a table 11 instead of providing the damper mechanism part in an interior of the table 11. It goes without saying that a weight 31, which constitutes the damper mechanism part 500, travels on guide rails 12 in the same manner as in the first embodiment.

The same cutting effect as that in the first embodiment is produced in this embodiment. In comparison with the first embodiment, it is possible to freely adjust the weight 31 in order to optimize the damping characteristic in response to the weight of the workpiece 61.

The invention provides a machine tool, which performs an efficient and stable cutting work of a large-sized or lengthy and heavy workpiece, and consequently enables contributing to reduction in material cost and to industrial use.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A machine tool making use of a rotating cutting tool to work a workpiece put on a cutting work table traveling on first guide rails with the use of torque of a ball screw part and wherein a damper mechanism part is mounted in a cavity provided on an opposite side of the table to that surface thereof, on which the workpiece is put, said damper mechanism comprising a weight, a spring and a damper, one ends of the spring and the damper being connected to an inner wall of the table with a vibratory direction of the spring agreeing with a moving direction of the table, the other ends of the spring and the damper being connected to the weight, and the weight being arranged in a manner to travel on second guide rails.

2. The machine tool according to claim 1, wherein the first guide rails on which the table travels serve also as the second guide rails on which the weight travels.

3. The machine tool according to claim 1, wherein the weight is arranged not to come into contact with the inner wall of the table.

4. The machine tool according to claim 1, wherein the machine tool is structurally configured such that an inertial force of the weight suppresses vibration between the table and the ball screw.

5. The machine according to claim 1, wherein
the machine tool is structurally configured such that an inertial force of the weight suppresses vibration between the table and the ball screw.

6. The machine tool according to claim 1, wherein the weight is in contact with the second guide rails.

7. The machine according to claim 1, wherein
the weight is in direct contact with the second guide rails.

8. The machine tool according to claim 1, further comprising:
a nut connected to the table; and
a servomotor that is operatively connected to the nut and that generates a motive force that is applied to the table through the nut, wherein the nut and servomotor are horizontally coplanar.

9. The machine tool according to claim 8, wherein
the first guide rails and the second guide rails are horizontally coplanar,
the ball screw part is positioned between the first guide rails and the second guide rails, and
a first end of the ball screw part is connected to the servomotor, a second end of the ball screw part is connected to a bearing, and a middle portion of the ball screw part is coupled to the nut.

10. A cutting work table for a machine tool making use of a rotating cutting tool, said cutting work table comprising:
rails;
a table on which a workpiece is mounted and which is capable of travelling on the rails;

a ball screw mechanism comprising a nut mounted on the table and a screw extending in a traveling direction of the table; and a damping mechanism comprising:
- a weight which is capable of traveling on the rails;
- a spring extending in the travelling direction of the table and interconnecting the weight and the table; and
- a damper extending in the travelling direction of the table and interconnecting the weight and the table.

11. The cutting work table according to claim 10, wherein the cutting work table is structurally configured such that an inertial force of the weight suppresses vibration between the table and the ball screw.

12. The cutting work table according to claim 10, wherein the weight is in direct contact with the rails.

13. The cutting work table according to claim 10, further comprising:
- a servomotor that is operatively connected to the nut and that generates a motive force that is applied to the table through the nut, wherein the nut and servomotor are horizontally coplanar.

14. The cutting work table according to claim 13, wherein the rails are horizontally coplanar,
the screw is positioned between the rails, and
a first end of the screw is connected to the servomotor, a second end of the screw is connected to a bearing, and middle portion of the screw is coupled to the nut.

15. A machine tool making use of a rotating cutting tool to work a workpiece put on a cutting work table traveling on first guide rails with the use of torque of a ball screw part, wherein
a weight is connected through a spring and a damper to a surface of the table perpendicular to a direction in which the table travels,
the weight is arranged in a manner to travel on second guide rails,
a nut is connected to the table,
a servomotor is operatively connected to the nut and generates a motive force that is applied to the table through the nut,
the nut and servomotor are horizontally coplanar,
the first guide rails and the second guide rails are horizontally coplanar,
the ball screw part is positioned between the first guide rails and the second guide rails, and
a first end of the ball screw part is connected to the servomotor, a second end of the ball screw part is connected to a bearing, and a middle portion of the ball screw part is coupled to the nut.

* * * * *